Dec. 26, 1967 E. K. SITTIG 3,360,749

ELASTIC WAVE DELAY DEVICE

Filed Dec. 9, 1964

INVENTOR
E. K. SITTIG
BY Roy M. Porter Jr.
ATTORNEY

United States Patent Office 3,360,749

Patented Dec. 26, 1967

3,360,749

ELASTIC WAVE DELAY DEVICE

Erhard K. Sittig, Berkeley Heights, N.J., assignor to Bell Telephone Laboratories, Incorporated, New York, N.Y., a corporation of New York Filed Dec. 9, 1964, Ser. No. 417,027
4 Claims. (Cl. 333—30)

Figure 1:
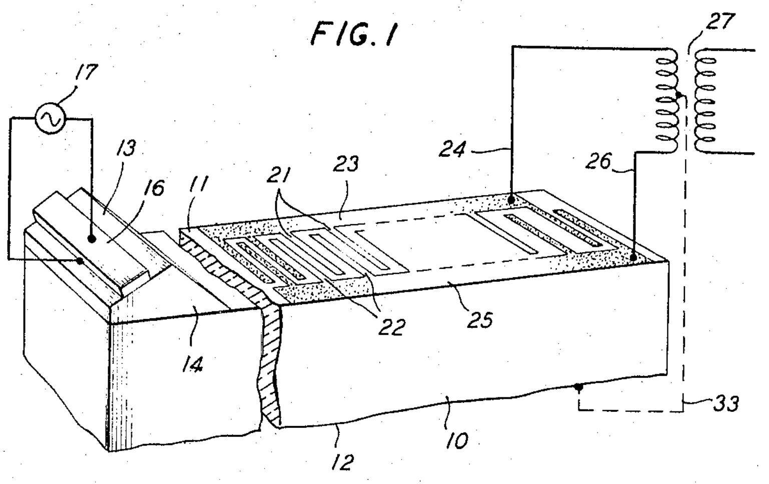

This invention relates to elastic wave delay devices and more particularly to elastic wave delay lines employing a Rayleigh surface wave in a piezoelectric member. Specifically, the present invention is an improvement upon the devices disclosed in the copending application of J. H. Rowen Ser. No. 333,022, filed Dec. 24, 1963, now Patent No. 3,289,114 issued Nov. 29, 1966.

As disclosed and claimed by Rowen, a Rayleigh wave propagating along a surface, referred to as the vibrating surface, in a plate of piezoelectric material may be detected by a plurality of electrodes distributed upon the surface to form one terminal while the other terminal is formed by an extended ground electrode upon the opposite dead surface. Such an array of electrodes detects the wave propagating past it because the surface wave has a particle displacement that generates a piezoelectric field normal to the plane of electrodes.

In accordance with the present invention it has been recognized that the structure thus described presents a design dilemma in that to allow free propagation of the surface wave, the plate must have a thickness of several wavelengths between the vibrating and the dead surface, but since the stress distribution of the surface wave occurs only in a layer of about one wavelength thickness below the vibrating surface, the piezoelectric voltage generated thereby is inefficiently detected by electrodes placed upon the widely spaced surfaces. Reducing the thickness of the plate to increase detection efficiency causes the wave to be distorted and spurious modes to be introduced by the nearness of the dead surface.

It is therefore an object of the present invention to improve the detection of elastic surface waves.

This object is accomplished in the present invention by a novel electrode arrangement which allows both terminals to be located upon the vibrating surface. In particular, two arrays of interlaced electrodes upon the surface form the terminals which are then connected out of phase. When properly spaced these electrodes efficiently couple to and from a piezoelectric field lying just under the vibrating surface. The unused dead surface may now be spaced as far as necessary from the vibrating surface and may in addition be acoustically treated to avoid undesired reflections and interference.

According to a further feature of the invention the integrity of the surface wave is further improved by locating the electrodes upon a separate carriage which is held in close but nontouching relationship to the vibrating surface. Coupling is efficiently provided to the piezoelectric field without disturbing the surface wave. A further feature of the invention made possible by this electrode design results in an ultrasonic delay line of variable length in which the position of the electrode carriage is movable to vary the distance and therefore the delay time from the input. The resulting variable delay line is a substantial improvement over prior forms of variable delay lines using solid delay media which inherently involve the difficulty of transmitting elastic waves through a slidable interface.

Figure 2:
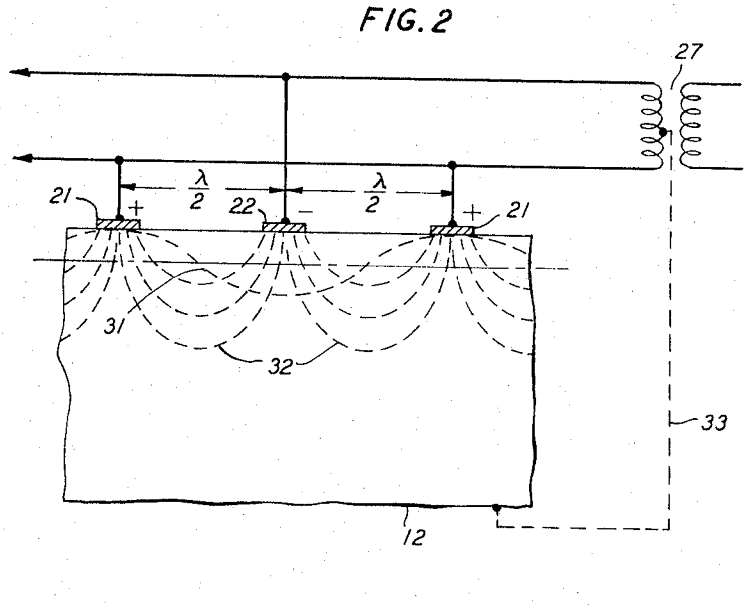
Figure 3:
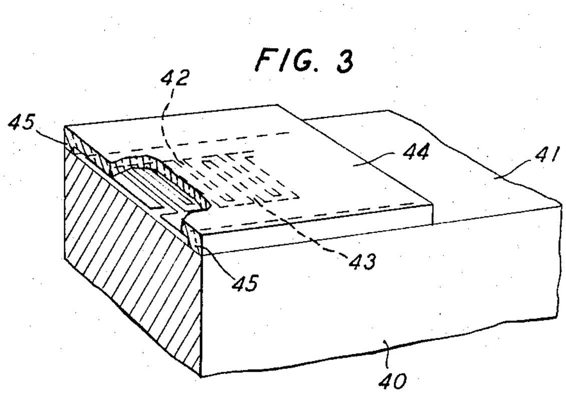

These and other objects and features, the nature of the present invention and its various advantages, will appear more fully upon consideration of the specific illustrative embodiments shown in the accompanying drawings and described in detail in the following explanation of these drawings:

In the drawings:

FIG. 1 is a perspective view of an illustrative embodiment having electrodes formed in accordance with the invention;

FIG. 2, given for the purpose of explanation, is a cross-sectional view of a small portion of the structure of FIG. 1; and FIG. 3 is a perspective view of a short section of another illustrative embodiment of the invention.

Referring more particularly to FIG. 1, an illustrative embodiment of the invention is shown comprising a section of delay line 10 in the form of a rectangularly cross-sectioned bar of any suitable ultrasonic propagation material having piezoelectric properties. For example, section 10 may be formed of a suitably cut quartz crystal, ADP, cadmium sulfide or other piezoelectric materials or sodium potassium niobate, barium titanate, or other poled ferroelectric ceramics.

Means are provided at the left-hand end of line 10 for launching a multifrequency wave of ultrasonic wave energy propagating therein as a Rayleigh surface wave along a path adjacent to and substantially parallel to surfce 11 and parallel to the longitudinal axis of line 10. As illustrated, this means comprises an electrical source 17 of signals applied to a conventional piezoelectric crystal or ceramic transducer 16 bonded to end face 13 of a wedge 14. Wedge 14 is preferably formed from a medium having an elastic wave phase velocity which is significantly lower than that of line 10. Provided this velocity difference is large, the dimensions and shape of wedge 14 are not critical and may readily be proportioned so that the mode of ultrasonic propagation generated by transducer 16 in wedge 14 has a velocity component parallel to surface 11 that is equal to the longitudinal velocity of the Rayleigh surface wave along line 10. A description and a mathematical analysis of this means for launching surface waves together with a mathematical analysis of the Rayleigh mode of propagation may be found in the following publications:

"Surface Waves at Ultrasonic Frequencies" by E. G. Cook and H. E. Van Valkenburg, ASTM Bulletin, May 1954, pp. 81–84.

"Inspection of Metals With Ultrasonic Surface Waves" by Willard C. Minton, Nondestructive Testing, July-August 1954, pp. 13–16.

"Investigation of Methods for Exciting Rayleigh Waves" by I. A. Viktorov, Soviet Physics-Acoustics, vol. 7, No. 3, January-March, 1962, pp. 236–244.

and in the above-mentioned copending application of J. H. Rowen. In addition, alternative methods of launching Rayleigh surface waves as described in these publications may be used to practice the present invention.

The Rayleigh surface wave is characterized by particle-displacements in at least two perpendicular directions, that is, normal to surface 11 upon which it is launched and along the direction of wave propagation. The wave is further characterized by an elastic vibration whose energy is confined to a narrow region just below the surface 11 and falls off exponentially toward the opposite surface 12. It is therefore convenient to refer to surface 11 as the vibrating surface and to surface 12 at the dead surface. Furthermore, the spacing between surfaces 11 and 12 should be several wavelengths, in the order of at least five, so that the dead surface is in fact dead and does not interfere with the surface wave on surface 11.

Since the particle displacement components of a surface wave vary both in the direction of propagation and in the direction normal to the surface, such a wave propagating in a piezoelectric material will be accompanied by a component of electric field normal to the surface for certain crystallographic orientations. However, since most materials of interest are mechanically anisotropic, the surface wave can propagate only along certain crystallographic axes. Thus, for a given material the optimum orientation must be determined from a knowledge of both the piezoelectric and elastic constants of the material in question.

A particular example in terms of quartz is given in the above-mentioned application of J. H. Rowen. As there described a single crystal of quartz formed, because of the particular anisotropy of its elastic constants, with the X or electrical axis along the direction of wave propagation and an axis in the YZ plane, different from Z, normal to the electrode surface. In quartz crystal terminology this is referred to as a rotated Y cut. For a discussion of the large number of cuts having different orientations with respect to the crystal axes of quartz together with a detailed description of the conventional designations of these cuts, reference may be had to either of the texts of W. P. Mason entitled, "Electromechanical Transducers and Wave Filters" or "Piezoelectric Crystals and Their Application to Ultrasonics," or the text of R. A. Heising entitled, "Quartz Crystals for Electrical Circuits," all published by D. Van Nostrand, Inc. of New York.

The present invention is concerned with an electrode arrangement for efficiently coupling to and from this electric field. As illustrated in FIG. 1 this arrangement comprises a large plurality of electrodes 21 through 22 located at longitudinally spaced points along surface 11 and arranged in two interlaced arrays that are connected out of phase to the desired output impedance by any suitable means such as transformer 27. These arrays are preferably formed by plating a uniform layer of conductive material on surface 11 and then etching away portions of it to leave a first array comprising the thin, narrow strips 21 each extending transversely across surface 11 to form acoustically separate electrodes which are then electrically tied together in the manner of a comb structure by side rail 23 to a common output terminal 24. The second array comprises strips 22 which are similar to and alternate with strips 21 and are tied together by side rail 25 to terminal 26.

In order to illustrate one application of the principles of the invention, i.e., that of modifying the delay time versus frequency arrangement of the components in a broadband signal, the spacing between the centers of adjacent electrodes varies with distance along the length of arrays according to the function which it is desired to reproduce as the frequency versus delay characteristics in the output energy. More particularly, the spacing between an electrode 21 of one array and the adjacent electrode 22 of the other array at one end of the arrays is equal to one-half wavelength of the surface wave at the highest frequency in the applied band and the spacing at the other end is equal to one-half wavelength at the lowest frequency in the band. Assume, for example, that the intended dispersion characteristic is one for which delay decreases with increasing frequency according to a linear function. Then the electrode spacing nearest wedge 14 is one-half surface wavelength at the highest frequency $f_2$ in the band; the electrode spacing furthest from wedge 14 is one-half wavelength at the lowest frequency $f_1$; and the spacing therebetween is varied according to linear relationship. It should be understood that this spacing may be varied according to any geometric, exponential, logarithmic, or other progression if such represents the desired dispersion variation. Theoretically each electrode should have a dimension parallel to the axis of line 10 comparable to one-half its spacing but in a practical case it has been found that a uniform dimension less than one-quarter wavelength of the highest frequency under consideration is satisfactory and is substantially more easily formed.

In operation, electrical energy from source 17 will be converted into ultrasonic vibrations by transducer 16 which are in turn coupled into a Rayleigh surface wave by wedge 14. As the surface wave passes electrodes 21 and 22, the strains which it sets up in the portion of the piezoelectric material of line 10 adjacent the electrodes causes an electric field to form.

The nature of this field as well as the coupling provided to it by the electrode arrays is most readily seen from FIG. 2 which represents an enlarged cross-sectional view of a fragment of the line of FIG. 1. The dashed curve 31 represents the strain and therefore the piezoelectric electric field gradient produced by this strain for a wave on surface 11. The amplitude of this electric field falls off exponentially toward surface 12, and is thus appreciable only in a surface layer no greater than one wavelength when compared to a distance between surfaces 11 and 12 of many wavelengths. The field is also periodic and reverses its sign every one-half wavelength in the direction of wave propagation. The dotted curves 32 are schematic of the lines of electric field capable of extending between electrodes 21 of one array and the electrodes 22 of the other array. The transverse components of these electric field lines are in the proper amplitude, sign and spacial distribution to couple strongly to the piezoelectric electric field 31 giving electrodes 21 a charge of one sign and electrodes 22 a charge of the other sign as indicated.

It may now be noted that the required relationships between particle displacement, piezoelectric axis and electric field are uniquely found in the Rayleigh surface wave. All other nondispersive modes of ultrasonic propagation customarily employed in bounded structures can only produce an electric field that is parallel to the bounding surfaces and are therefore unsuitable for practicing the present invention. For example, a compressional or longitudinal plane wave has both a particle displacement and an electric field parallel to the direction of propagation. A nondispersive shear or transverse wave has a particle displacement parallel to the surface of the medium and perpendicular to the direction of propagation and, depending upon the piezoelectric orientation, can produce electric fields along either the propagation or displacement directions, but not normal to the surface. Even though the longitudinal portions of field lines 32 have the possibility of coupling to piezoelectric fields parallel to the surface generated by compressional and shear modes, they are not in fact coupled in any significant extent either because they produce only small electric fields at the surfaces in bodies more than a few fractions of a wavelength in thickness or because they have wavelengths sufficiently different from the surface wave so that they are discriminated against by the periodic electrode spacing which is critical in terms of the wavelength and phase of the surface wave alone.

Since surface 12 performs no electrical function it may be as widely spaced from surface 11 as required and may be roughened or otherwise acoustically treated to absorb spurious modes and reflections. While not required, an optional ground connection 33 may also be made from a center tap on transformer 27 to a conductive layer on surface 12. It should also be apparent that if an unbalanced load is satisfactory, both transformer 27 and ground 33 may be removed.

Whether or not the ground or transformer connection is employed, the positive voltages detected by the electrodes of one array and the negative voltages detected by the other array combine as follows. For the specific case in which the electrode spacing is varied to produce frequency dispersion, the voltages detected by the first several adjacent electrodes of the respective arrays combine out of phase in a load to produce an electrical output representative of the signal $f_2$. As time passes components at the frequency $f_2$ proceed further along the arrays and the electrode spacing becomes increasingly longer than one-half the wavelength at frequency $f_2$. Therefore, the phase of the voltage detected by each successive electrode is later than the one just preceding it and the response of one electrode tends to cancel the response of another.

For the frequency $f_1$ at the low end of the band the situation is exactly reversed. Since the wavelength is substantially greater than twice the electrode spacing near wedge 14, the voltages detected by each successive electrode are earlier in phase than the ones just preceding it and tend to cancel. However, as the wave continues its travel along the electrode array, the electrode spacing eventually equals one-half the wavelength at the frequency $f_1$ and the voltage detected by adjacent electrodes is proper to produce an output voltage.

Thus, ultrasonic energy of the frequency $f_2$ will be detected by the first portion of the electrode array, a wave of the frequency $f_1$ will be detected by the last portion of the electrode array and waves of intermediate frequencies will be detected by intermediate portions of the electrode array. Each component frequency has a time delay proportional to the distance from the input to the point of detection. The order in which the highest frequency component, the lowest frequency component, or any intermediate component is detected and the distance from the input at which this detection occurs may be arbitrarily selected by proper arrangement of electrodes to produce any desired delay characteristic.

Considerations concerning the number of electrodes, alternative spacing arrangements to produce other frequency selective and nonfrequency selective characteristics, and several specific uses for these characteristics are disclosed in the above-mentioned application of J. H. Rowen. Furthermore, the structure described is fully reciprocal. Thus, a multifrequency signal applied in push-pull between the electrode arrays will produce a multifrequency Rayleigh surface wave traveling away from the array with each component frequency originating as an ultrasonic wave only at that location for which the electrode spacing equals one-half its surface wave wavelength. As a source of Rayleigh surface waves, the interlaced arrays may be used in the several prior art applications to generate surface waves and may be substituted for wedge 14 and transducer 16 of FIG. 1.

It has been found, that even film thin electrodes have an appreciable loading on the wave when plated directly on the surface and tend to distort the wave and generate spurious modes. Substantial improvement is provided in accordance with the invention by arrangement shown in FIG. 3.

In FIG. 3 is a section of piezoelectric delay line 40 is shown which is identical to line 10 of FIG. 1 except that no electrodes are located directly upon the vibrating surface 41. Instead, the electrode arrays 42 and 43 (which correspond in all other ways to arrays 21 and 22 of FIG. 1) are arranged on the under surface of carriage 44 which is suitably held in close but nontouching relationship to surface 41. Merely for the purpose of illustration, carriage 44 is provided with side spacers 45 to maintain its position but it should be understood the size of these spacers is highly exaggerated and in a practical case the required separation will be small compared to one wavelength. In particular, the inherent surface roughness, even of a polished surface, will provide adequate spacing since this roughness is large compared to the vibration amplitudes which are in the order of Angstroms with the power and in the frequency ranges here contemplated. It should be noted that electrodes 42 and 43 electrostatically detect the electric fields developed in body 40 and that no elastic energy is transferred to carriage 44. Therefore, carriage 44 is free to be moved to any position along line 41 to vary the delay time. This arrangement is to be contrasted with various forms of variable delay line in the prior art in which the elastic wave energy itself must be transmitted through a slidable interface.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. An ultrasonic device comprising a body of piezoelectric material, means for launching within said body an ultrasonic wave having a particle displacement that is normal to one surface of said body and that has a maximum amplitude at said surface decreasing with distance away from said surface, electrode means for coupling with said wave on said surface while maintaining the integrity of said wave, said last named coupling means including a plurality of spaced conductive members physically separated from said one surface by a distance that is small compared to a wavelength of said wave, said members comprising means for detecting a piezoelectric field normal to said surface generated by said particle displacement at a multiplicity of spaced points along the direction of propagation of said wave, means for electrically connecting alternate ones of said members together to form two arrays, a load impedance, and means for connecting each of said arrays to opposite sides of said load impedance.

2. The combination according to claim 1 wherein said conductive members are physically disposed upon a surface of a second body slidably related to said one surface of said first-named body.

3. The combination according to claim 1 wherein said launching means includes a broadband source of signals and an ultrasonic piezoelectric transducer mechanically coupled to said surface, and wherein the spacing between certain adjacent conductive members on respectively different portions of said surface is one-half wavelength of the highest and lowest frequencies, respectively, of the energy in said band.

4. The combination according to claim 3 wherein each of said conductive members has a dimension parallel to the direction of propagation of said wave that is no greater than one-quarter wavelength of said ultrasonic wave.

References Cited

UNITED STATES PATENTS

| | | | |
|---|---|---|---|
| 2,941,110 | 6/1960 | Yando | 315—3 |
| 2,965,851 | 12/1960 | May | 333—30 |
| 3,070,761 | 12/1962 | Rankin | 333—30 |
| 3,289,114 | 10/1966 | Rowen | 333—30 |
| 3,300,739 | 1/1967 | Mortley | 333—30 |

FOREIGN PATENTS 988,102 4/1965 Great Britain.

OTHER REFERENCES

ASTM Bulletin, May 1954, pp. 81–84, "Surface Waves Etc." by Cook and Valkenburg.

HERMAN KARL SAALBACH, *Primary Examiner.*

ELI LIEBERMAN, *Examiner.*

C. BARAFF, *Assistant Examiner.*